Nov. 6, 1956 E. MAILE 2,769,900

TRAIN CONTROL APPARATUS

Filed May 26, 1951 5 Sheets-Sheet 1

INVENTOR.
Evangelino Maile
BY
W. W. Williamson
ATTORNEY

Nov. 6, 1956

E. MAILE 2,769,900

TRAIN CONTROL APPARATUS

Filed May 26, 1951

INVENTOR.
Evangelino Maile
BY
W. W. Williamson
ATTORNEY

Nov. 6, 1956   E. MAILE   2,769,900
TRAIN CONTROL APPARATUS
Filed May 26, 1951   5 Sheets-Sheet 4

INVENTOR.
Evangelino Maile
BY
W. W. Williamson
ATTORNEY

Nov. 6, 1956            E. MAILE            2,769,900

TRAIN CONTROL APPARATUS

Filed May 26, 1951            5 Sheets-Sheet 5

INVENTOR.
Evangelino Maile
BY
ATTORNEY

United States Patent Office 2,769,900
Patented Nov. 6, 1956

2,769,900
TRAIN CONTROL APPARATUS
Evangelino Maile, Philadelphia, Pa.
Application May 26, 1951, Serial No. 228,493
12 Claims. (Cl. 246—182)

My invention relates to a new and useful Train Control Apparatus and one very particular object of this invention is to provide means for automatically maintaining control of a train, or vehicle unit, operating upon tracks, in contradistinction to merely stopping the train in case of danger or failure of the operator to obey caution and stop signals and relying upon his judgment as to what course to pursue under certain conditions.

Heretofore, in appliances of this general type, the usual object has been to stop a train whenever a dangerous condition existed ahead of it without regard to whether the dangerous condition was permanent or only temporary. Contrary to the foregoing one of the principal objects of the present invention is to keep a train moving and to this end it is controlled through regulation of the maximum speed between any two predetermined locations; by providing signals, either visible or audible or both, in the vicinity of the operator's position to keep him informed of the condition of the roadway; by reducing the speed of the train and causing another signal to function should the operator fail to heed a caution signal; and finally, to bring the train to a full stop in case of a dangerous condition existing in the block immediately ahead of the train, the instrumentalities producing the above outlined functions being immediately reset, permitting manual operation to be resumed, when the adverse conditions are eliminated.

Another object of this invention is to provide a plurality of operating hooks for actuating several separate mechanisms under predetermined situations; to continuously reciprocate said operating hooks at varying speeds in accordance with the speeds of the train on which they are installed; to intermittently elevate and lower the inner ends of said hooks; and under certain conditions to simultaneously either lower or elevate the outer ends of said hooks.

Another object of the invention is to provide individual cams for controlling the vertical movements of the inner ends of the operating hooks.

Another object of the invention is to provide fluid operated means for controlling the vertical movements of the outer ends of said operating hooks.

Another object of this invention is to provide a combined cam and electro-magnetically actuated means for regulating the fluid flow to and from the said fluid operated means.

Another object of the present invention is to provide a train control apparatus especially adapted for use on railroads having very heavy traffic thereover and wherein all of the control operations are accomplished within any one or more of the multiplicity of signal blocks into which the road is divided.

Another object of this invention is to produce a train control apparatus including means to provide a caution signal in either the second block ahead or the one immediately preceding the danger block; to provide means to slow down the train in either said second block ahead of or the one immediately preceding the danger block; and means to stop the train in said block immediately preceding the danger block. In other words all operations can take place over a plurality of blocks or can occur in the block immediately preceding the danger block.

A further object of the invention is to utilize primary and secondary electrical circuits of the closed type for initiating the operations and regulating the functions of certain of the elements.

A still further object of the invention is to provide for slowing down the train gradually prior to the stopping thereof, which will, as near as possible, imitate the actions of an operator when bringing a train to a stop or preparing for such final operation.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawings forming a part hereof in which.

In carrying out my invention as herein embodied 25 represents wheels of railway locomotive, coach or other vehicle running on the rails 26 of a track divided into electrical signal blocks in any well known manner.

Power is transmitted from a wheel 25, as from a worm 27 connected with the wheel 25 to a worm gear 28 on a shaft 29 supported in any suitable manner. On the shaft 29 is a second gear 30 meshing with a gear 31 on a shaft 32 which also carries a bevel gear 33. The latter gear meshes with a companion bevel gear 34 mounted on a flexible shaft 35 here shown, for purposes of illustration only, as composed of a number of sections connected by universal joints and having an extensible element 36, conventionally represented, to compensate for curves in the track. Another bevel gear 37 is mounted on the flexible shaft 35 and said gear 37 meshes with a similar gear 38 on the upright governor shaft 39 suitably supported and, preferably, projecting into the housing 40 for the main elements of the control mechanism. On the governor shaft 39 is slidably and rotatably mounted a sleeve 41 connected to the governor 42 the head of which is fastened to said governor shaft 39. The purpose and operation of the governor and associated sleeve will be later described.

On the governor shaft 39, below the sleeve 41, is fixed a gear 43, Fig. 1, with which meshes a gear 44 on the crank shaft 45 suitably supported within the housing 40, as in bearings 46. The crank shaft 45 may have a gear box 47 interposed therein for changing the speed of the crank 48 to which is pivoted one end of a pitman 49, the other end of said pitman being pivoted to a cross bar 50 to be reciprocated by the operation of the crank. On the cross bar 50 are fixedly mounted several arms 51, 52 and 53 and said arms project through openings in a supporting bar 54 immovably mounted in the housing 40.

A plurality of operating hooks, 55, 56 and 57 are provided and the inner ends of the shanks of these hooks are each pivoted to a separate one of the arms 51, 52 and 53 whereby said hooks may oscillate under certain conditions to be later described. At the outer end of each hook is a barb 58 to grip a shackle described below.

Figures 5, 6, 7, 8, 9:
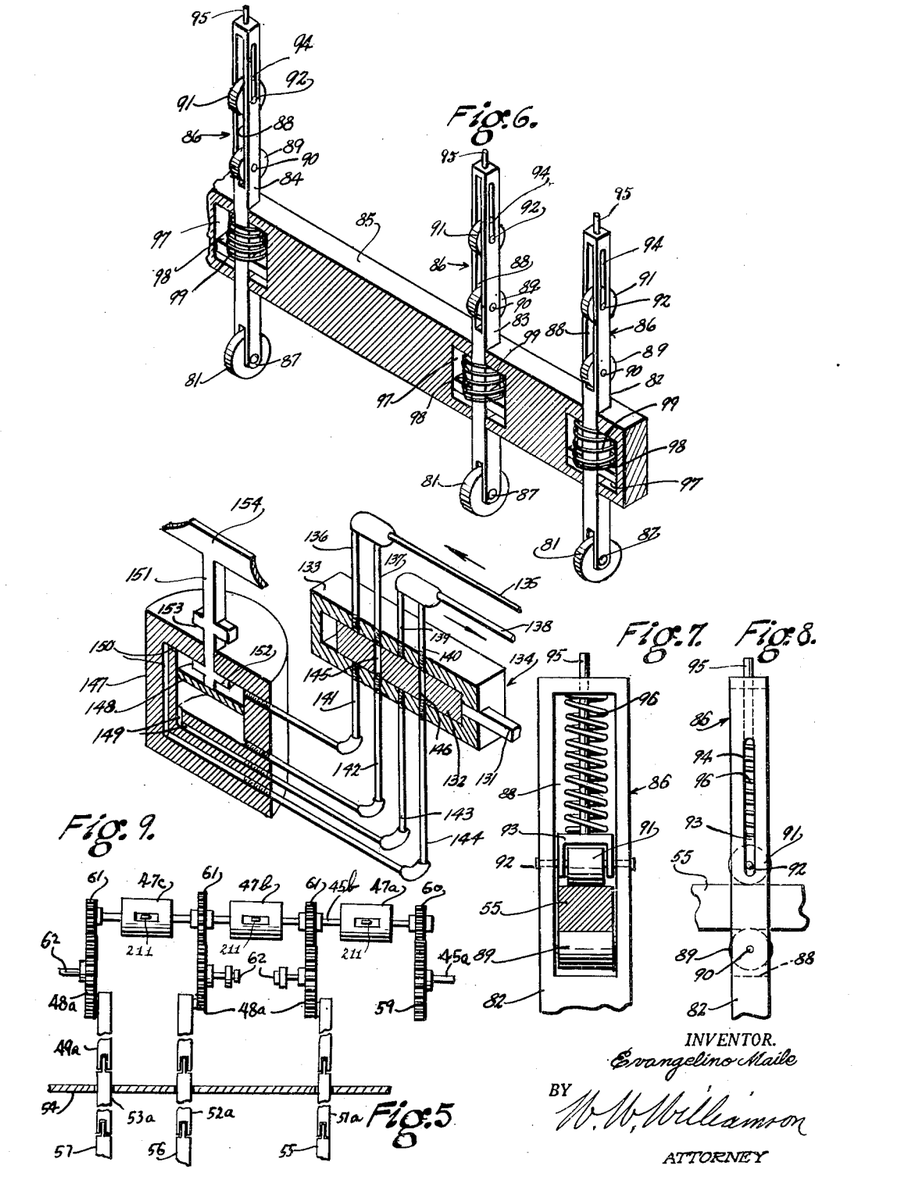
Fig. 5 is a plan view of a modified form of operating hook reciprocating means.
Fig. 6 is an enlarged perspective view, partly in section and partly in elevation of the cam operated mechanism for vertically moving the inner ends of the operating hooks.
Fig. 7 is a further enlarged fragmentary front view of one of the reciprocating holders for the operating hooks.
Fig. 8 is a side view thereof.
Fig. 9 is an enlarged perspective view, partly in section and partly in elevation, of the fluid actuated mechanism and the regulating valve therefor.

The means illustrated in Fig. 5 may be substituted for that described above for reciprocating the operating hooks whereby each or preselected ones may be reciprocated at varying speeds. In said Fig. 5 the shaft 45a is equivalent to shaft 45. On the shaft 45a is a gear 59 meshing with a gear 60 on the sectional shaft 45b having gear boxes 47a and 47b and 47c interposed between the several sections of said shaft 45b to regulate and vary the speeds of the different sections relative to each other. On the various shaft sections are gears 61, which may be of different sizes or all of the same size, and each mesh with a proper size and suitable crank gear 48a journalled on suitable separate trunnion shafts 62. The inner end of a pitman 49a is pivoted to each of the crank gears 48a while the outer ends are pivoted to the inner ends of separate arms 51a, 52a and 53a all projected through and slidably mounted in the supporting bar 54. To the outer ends of the respective arms 51a, 52a and 53a are pivoted the inner ends of the hooks, 55, 56 and 57.

Figures 1, 2:
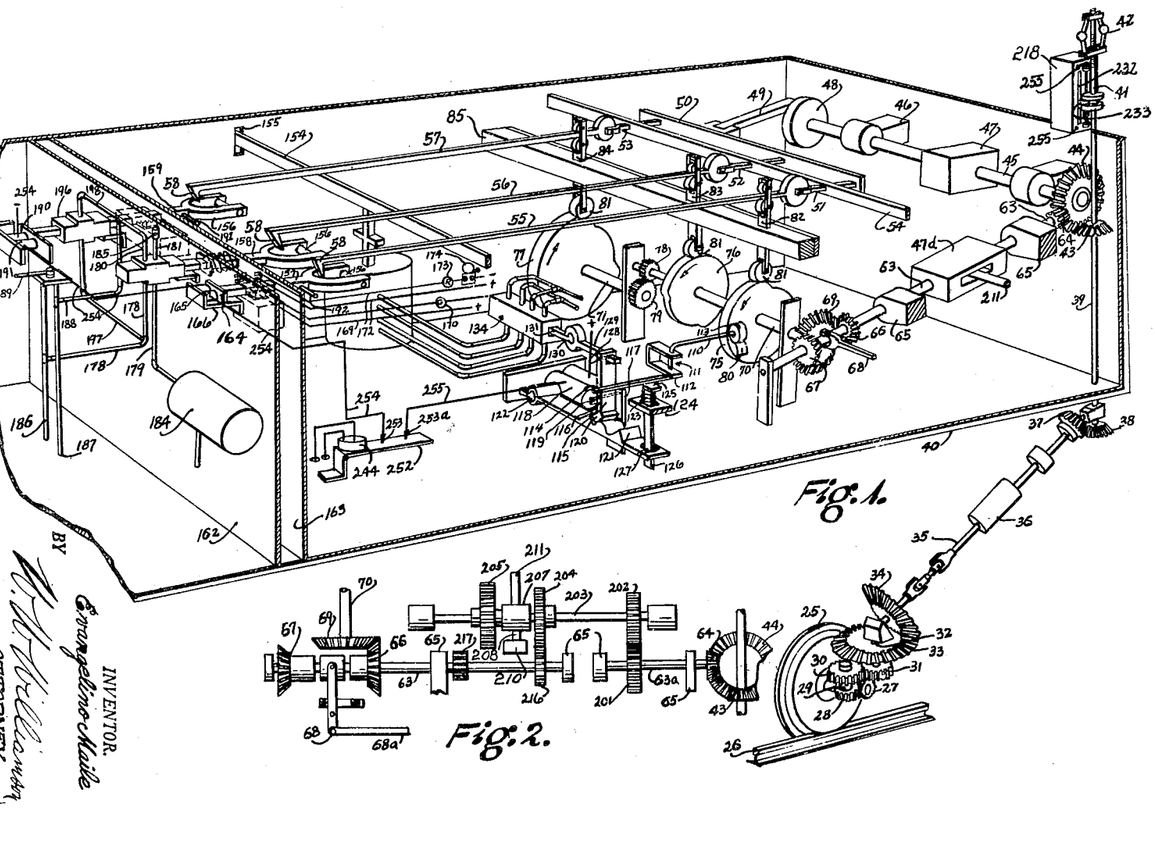
Fig. 1 is a perspective view, partly in elevation and partly in section, of the train control apparatus embodying the features of the invention, with the main parts shown in a cabinet type of support.
Fig. 2 is a side view of the train of gears, the gear box being removed, and showing their relation to adjacent elements of the control mechanism.
Figures 10, 11, 12, 13, 14, 15:
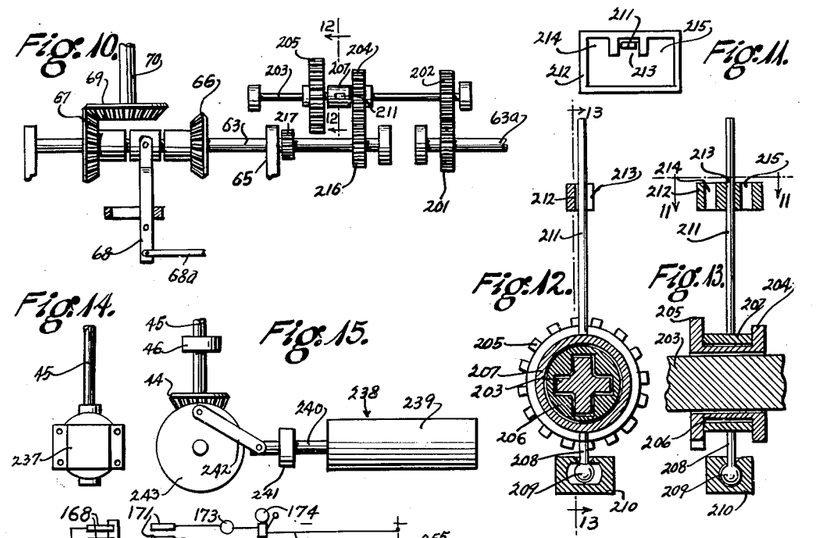
Fig. 10 is a view of the train of gears, similar to Fig. 2, showing one set of shiftable gears in another position.
Fig. 11 is an enlarged view of the shifting lever holder and position selector on the line 11—11 of Fig. 13.
Fig. 12 is an enlarged cross sectional view of the shifting mechanism on the line 12—12 of Fig. 10.
Fig. 13 is a vertical section on the line 13—13 of Fig. 12.
Fig. 14 is a view of an electric motor for operating the apparatus which may be substituted for the operating means shown in Figs. 1 and 3.
Fig. 15 is a view of another apparatus operating means in the form of a piston and cylinder.

The sectional countershaft 63, Figs. 1, 2 and 10, is driven in any suitable manner, especially from the upright shaft 39, as through a gear 64 meshing with the gear 44, Figs. 1 and 2, which gear 64 is fixed to one end of the countershaft 63 supported in suitable bearings 65 within the housing 40. A gear box 47d is interposed between the sections of the countershaft 63 whereby the relative speeds of said sections may be varied as desired. On the end of the countershaft 63 opposite the gear 64 are mounted a pair of opposed shiftable gears 66, 67 for rotation with said countershaft 63 and slidable longitudinally thereof through the medium of the gear shift mechanism 68.

Figures 18, 19, 20, 21, 22:
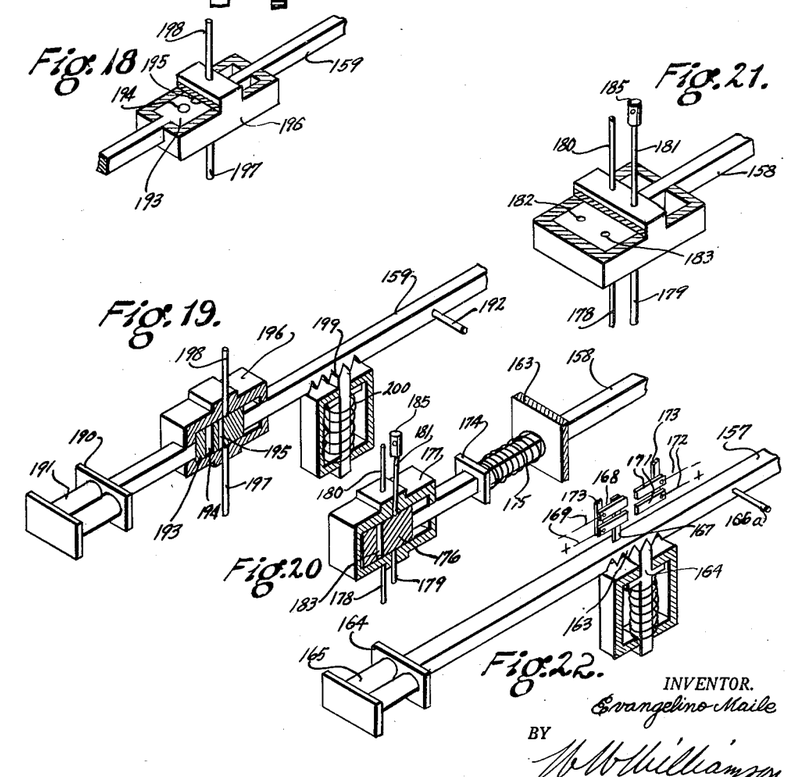
Fig. 18 is a prespective view of one of the valve structures partly broken away in a horizontal plane and shown in section to illustrate details of construction.
Fig. 19 is a similar view of the same valve structure and associated elements partly broken away in a longitudinal vertical plane.
Fig. 20 is a view in perspective, partly in elevation and partly in section, of another valve structure and its operating elements.
Fig. 21 is a slightly enlarged perspective view of the valve structure of Fig. 20 partly broken away in a longitudinal horizontal plane.
Fig. 22 is a perspective view of one of the switch structures for opening and closing electrical circuits.

The gears 66, 67 may be made to selectively mesh with the gear 69, common to both of the gears 66, 67, and said gear 69, is fixed to the cam shaft 70. The cam shaft 70 may be one continuous shaft or it may comprise two sections 70 and 71, as illustrated in Fig. 1 or several sections 70a, 72, 73 and 74 as shown in Fig. 18. This cam shaft or its various sections carry cam wheels properly timed for causing the elevation and descent of the inner ends of the operating hooks in desired sequence.

For purposes of illustration I have shown in Fig. 1, two cam wheels 75 and 76 mounted on the main section 70 of the cam shaft revolving counterclockwise and another cam wheel 77 mounted on the auxiliary section 71 and the two shaft sections are geared together by the gears 78 and 79 of two to one ratio so that cam wheel 77 revolves clockwise. Each cam wheel has peripheral high and low cam surfaces so positioned relative to those on each of the other cam wheels that the low surface of only one cam wheel will be in operative position at any one preselected time. A fourth cam 80, to be known as the knock-off cam, is located on the side of the cam wheel 75, as depicted in Fig. 1, the operation of which will be presently described, but said knock-off cam 80 reaches the operative position just prior to the low cam surface of the cam wheel 75 assuming the operative position.

Cooperating with the peripheral cam surfaces of the respective cam wheels 75, 76 and 77 are cam follower wheels 81, Figs. 1 and 6, which are rotatably mounted on the lower ends of the vertically actuated oscillators 82, 83 and 84 for raising and lowering the inner ends of the several operating hooks. These oscillators project through and are slidably mounted in the transversely arranged guide bar 85 located within the housing 40. As shown, particularly in Figs. 6, 7 and 8, each oscillator includes a body 86 having its lower end bifurcated to accommodate the follower wheel mounted on an axle 87 while the upper end of said body has a recess 88 open from front to back. In the lower part of the recess 88 is rotatably mounted a roller 89 on an axle 90 in a fixed position and in the upper portion of said recess is located a reciprocating roller 91 rotatably mounted on an axle 92 having its ends fixed in a fork 93 and slidably arranged in the slots 94 longitudinally of the body 86. From the fork 93 projects a stem 95 through the upper end of the body 86 and about said stem is a coil spring 96 between the upper end of the body 86 and the fork to normally urge the latter downward or towards the roller 89. The shank or body portion of each operating hook, 55, 56 and 57, is positioned between the pair of companion rollers 89 and 91 in its respective oscillator. The guide bar 85 is provided with a plurality of spring chambers 97, Fig. 6, one in line with each oscillator and through which each oscillator projects and each oscillator is provided with a shoulder 98. Between a shoulder 98 and the top of a spring chamber 97 is located a spring 99 to normally urge its associated oscillator downward to maintain a follower wheel 81 in contact with a cam surface of a cam wheel.

When the cam shaft includes several sections 70a, 72, 73 and 74, Fig. 18, a knock-off cam wheel 100 is mounted on the shaft 70a and is provided with a knock-off cam 101 on a face thereof. Also on said shaft 70a is a gear 102 meshing with a larger intermediate gear 103 which, in turn, meshes with a similar gear 104 on the shaft 72 carrying the cam wheel having peripheral high and low cam surfaces. A second gear 105, the same size, preferably, as gear 104 and said gear 105 meshes with a larger intermediate gear 106 which, in turn, meshes with a smaller gear 107 on the shaft 73 carrying the cam wheel 76a having peripheral high and low cam surfaces. Likewise a second gear 108, preferably the same size as gear 107, is mounted on the shaft 73 and said gear 108 meshes with the larger gear 109 mounted on the shaft 74 carrying the cam wheel 77a having peripheral high and low cam surfaces. It is generally desired that, beginning with shaft 70a, each succeeding shaft, 72, 73, 74, revolves twice as fast as the preceding one and for this reason the gears are increased in size in a two to one ratio and it is preferred that all but the cam wheel 77a revolve clockwise while said cam wheel 77a revolves counterclockwise.

Cooperating with knock-off cam 80, 101 is one arm 110 of a bell crank lever 111 journalled in a suitable bracket 112 supported in the housing 40 and said arm has an anti-friction roller 113 thereon to be engaged by said knock-off cam 80. The outer arm 114 of the bell crank lever coacts with the upper end of the lever 115 above the pivot 116, which pivot is secured to a suitable bracket 117 supported in the housing 40, for moving said upper end of the lever 115 inward under certain conditions and moving the lower end of said lever 115 in the reverse direction. Said lower end of the lever 115 is normally drawn inwardly by the electro-magnetic means 118 acting upon the armature 119 on said lower end of the lever 115. The lower terminal of the lever 115 is fashioned to constitute a pawl 120 which coacts with the ratchet 121 pivoted at 122 for vertical movements and the outer free end of said ratchet is urged upwardly towards the pawl end of the lever 115 by a spring 123 having one end resting against the relatively stationary bracket 124 supported in the housing and the other end of said spring engaging the head 125 of the lift rod 126 which projects through the bracket 124 and its lower end pivoted at 127 to the free end of the ratchet 121. The arrangement of pawl and ratchet will hold the lever 115 in either of its locations without the likelihood of being accidentally jarred out of position.

The upper end of the lever 115 is pivoted at 128 to an extension rod 129 which is pivoted at 130 to the valve 131 of sliding valve plug or gate 132 reciprocatingly mounted in the casing 133 of the fluid control valve 134, Fig. 9. A fluid inlet pipe 135 leads from a source of fluid supply (not shown), such as a storage tank, to the branches 136, 137 which communicate with the interior of the valve casings 133 at one side thereof in predetermined spaced relation. A fluid outlet pipe or exhaust 138 has branches 139, 140 connected therewith, also communciating with the interior of said valve casing on the same side thereof as the inlet branches and said outlet branches are spaced apart similar to the inlet branches.

From the opposite side of the valve casing 133 and communicating with the interior thereof lead the companion inlet pipes 141 and 142 and the companion outlet pipes 143 and 144 in direct alignment with the respective pipes 136, 137, 139 and 140. The valve plug or gate 132 has two passageways 145 and 146 spaced to simultaneously cooperate with one of the inlet branches 136, 137 and one of the outlet branches 139, 140, according to the position of said valve plug or gate in the valve casing. Therefore, when the valve plug or gate is retracted, as shown in Fig. 9, the inlet branch 137 is open to the companion inlet pipe 142 and the companion outlet pipe 144 is open to the outlet branch 140.

A fluidtight cylinder 147 is supported within the housing 40 and has a piston 148 vertically slidable therein to be actuated by the fluid pressures as presently described. The inlet pipes 135, 136, 141 communicate with the interior of the cylinder 147 above the piston 148 while the inlet pipes 135, 137, 142 communicate with the interior of said cylinder below said piston 148. The outlet pipes 143, 139, 138 communicate with the space below the piston through the duct 149 while the outlet pipes 144, 140, 138 communicate with the space above the piston through the duct 150.

A piston rod 151 is carried by the piston 146 and projects through the head of the cylinder with shoulders 152 and 153 thereon inside and outside, respectively, of the cylinder head to limit the movements of the piston rod and associated parts. On the upper end of the piston rod 151 is a cross bar 154, Figs. 1 and 9, that supports the operating hooks at the outer ends thereof and the ends of said cross bar 154 are guided in apertures 155 in the sides of the housing 40.

From the foregoing it will be apparent that each time the knock-off cam 80 actuates the bell crank lever 111 the upper end of the lever 115 will be swung inwardly, Fig. 1, to slide the valve plug or member 132 forwardly from the position shown in Fig. 9. This will cause the passageway 145 to register with the pipes 136, 141 and also cause the passageway 146 to register with the pipes 139 and 143 thus opening communications from a source of fluid supply through 135, 136 and 141 to the cylinder 147 above the piston 148 and from said cylinder below the piston through 143, 139 and 138 to the atmosphere or location of exhaust. As fluid enters the cylinder, the piston 148 will be moved downwardly to cause withdrawal of the cross bar 154 from the operating hooks 55, 56, 57 whereby any or all of said hooks may descend when and if the oscillators 82, 83, 84 descend individually or finally as a group. The above enumerated actions will continue to take place each time the knock-off cam 80 engages the bell crank lever 111 providing the electro-magnets 118 are energized because in such case the lever 115 will be returned to its normal position, as shown in Fig. 1, and the valve plug 132 will be retracted to the position shown in Fig. 9 and the piston 148 with the cross bar 154 will be elevated but if the electromagnets 118 are not energized, the cross bar 154 will remain in its lowered position whereby the operating hooks may function for purposes to be described below when the oscilaltors 82, 83, 84 descend. In any case the lever 115 is maintained in either of the positions it can assume by the pawl structure 120 and the cooperating resilient ratchet 121 until acted upon by the bell crank lever or the electro-magnets.

Figures 3, 4:
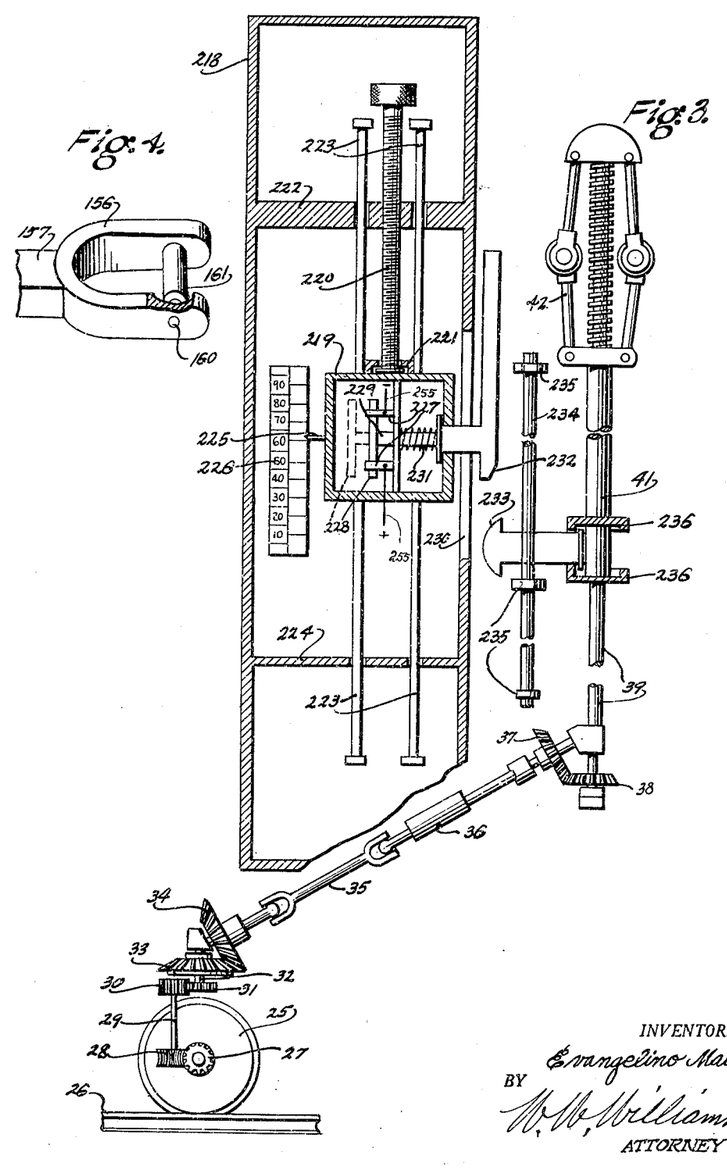
Fig. 3 is an enlarged broken sectional elevation of the speed regulator elements of the apparatus.
Fig. 4 is an enlarged perspective view of one of the clevises to be engaged by an operating hook, a portion of the clevis being broken away to illustrate a detail of construction.

The several operating hooks 55, 56, 57, under certain conditions, are adapted to cooperate with separate companion shackles 156, Figs. 1 and 4, one on each of the respective pull rods 157, 158 and 159, Figs. 1 and 19 to 23, to draw said pull rods in one direction against the retractive action of suitable means, such as a spring or electro-magnets. Each shackle 156 includes an axle 160, Fig. 4, mounted in the shackle arms across the space between them and an anti-friction roller 161 journalled on the axle to be engaged by the barb of an operating hook.

The pull rod 157 projects through the two parallel partitions 162 and 163, Fig. 1, mounted in the housing 40, crosswise thereof, and the rear end of said pull rod, opposite the shackle thereon, carries an armature 164, Fig. 23, to be attracted by the electromagnet 165 supported by a bracket 166 secured to the partition 162. Said pull rod 157 has ratchet teeth 163 to be engaged by the spring operated pawl 164 whereby the pull rod 157 may be temporarily retained in any set position until acted upon by its operating rod 55 or the electromagnet 165. Should an occasion arise when the pull rod 157 had to be operated manually, this can be done through the medium of a handle 166a on said pull rod within access of the operator of the vehicle, in case of an emergency.

Mounted on said pull rod 157 and movable therein is an electrical switch blade 167 to alternately engage the pair of electrical contacts 168 of an electric circuit 169 including a signal means 170, such as a green lamp, Fig. 1, to indicate a "safe" condition, and the other pair of contacts 171 of an electric circuit 172 including a visible and/or audible signals 173 and 174, respectively, such as a red light and a bell. The contacts 168 and 171, as well as the spring pawl 164 may be mounted on and between the partitions 162 and 163. Supports or brackets 173 are shown for the contacts in Fig. 23 and these supports or brackets may be secured to the partitions or be parts thereof.

The pull rod 158 also projects through both partitions 162 and 163 and has a shoulder 174, Fig. 21, thereon within the space between said partitions. To normally urge the pull rod 158 forwardly, a spring 175 is provided and may be of the coil type so as to mount it on the pull rod with one end in engagement with the partition 163 as the stationary element and the other end of said spring engaging the shoulder 174 as the movable element.

On the other end of the pull rod 158 is a valve plug 176 slidably mounted in a valve casing 177 having two fluid intake pipes 178 and 179 leading to one side thereof and two pipes 180 and 181 leading from the other side of said valve casing, preferably in direct endwise alignment with the pipes 178 and 179. The valve plug 176 has two, side by side, passageways 182 and 183, Fig. 22, therethrough to register with the pipes 178 and 180, and the pipes 179 and 181, respectively for passing fluids through the separate pipe lines. The line, including pipes 179 and 181, is connected to a suitable source of fluid under pressure, such as a storage tank 184 and an audible signal 185, such as a whistle. The line, including pipes 178 and 180, leads from the intake side of the fluid brake system represented by the pipe 186, Fig. 1, to the return pipe 187, through a common return branch pipe 188.

The intake and return pipes 186 and 187 have a fluid brake valve 189 associated therewith for manually controlling the vehicle brakes.

The pull rod 159, like the others, also projects through the two partitions 162 and 163 and is provided with an armature 190 to be attracted by the electromagnet 191 and has a handle 192, Fig. 20, whereby said pull rod may be actuated manually should the occasion arise requiring such actuation. Intermediate the ends of the pull rod 159 is located a valve plug 193 having a plurality of passageways 194, 195 in spaced relation longitudinally of said valve plug and the latter is slidably mounted in the valve casing 196 for controlling the passage of fluid from the intake side of the brake system, as through a pipe 197 connected to the pipe 178 and one side of said brake system, through the pipe 198 leading from the opposite side of said valve casing, in direct endwise alignment with the pipe 197, to the common return branch pipe 188. The pull rod 159 is provided with ratchet teeth 199 to be engaged by the spring operated pawl 200 whereby said pull rod 159 may be temporarily retained in any set position until operated upon by its operating hook 57 or the associated electromagnet 191 and the pawl structure may be located between and supported by the partitions 162 and 163.

In each of the gear boxes 47, 47a, 47b and 47c (see Fig. 5) is a change of speed chain of gears such as depicted in Fig. 2 and 10, with the box itself omitted, wherein a gear 201 is fixed on the countershaft section 63a and meshes with a gear 202 on a shaft 203 whereby the latter is driven at a constant speed relative to the countershaft section 63a. Also on the shaft 203 is a small gear 204 and a large gear 205 both of which are shiftable longitudinally along the shaft 203. A preferred construction of these last mentioned gears and the shifting means is particularly illustrated in Figs. 11, 12 and 13, wherein the gears 204 and 205 are shown as joined together by a sleeve 206 splined on the shaft 203 and surrounded by a collar 207 in which the sleeve may revolve. Connected with the collar 207 is a shifting lever including a footpiece 208 having a ball 209 mounted for extensive movements in a socket 210, and handle 211 for manually shifting the mechanism, said handle being temporarily held in any one of three positions by a rack 212 having a neutral position recess 213 and opposite working position recesses 214 and 215. The smaller gear 204 is adapted to be moved into and out of engagement with the larger gear 216 on the countershaft section 63 and the larger gear 205 is adapted to be moved into and out of engagement with the smaller gear 217 on said countershaft section 63 for changing the relative speeds between the driving and driven countershaft sections or stopping the driven countershaft section.

To regulate and control the speed of the train or vehicle at any predetermined maximum limit I provide a casing 218, having an access opening normally closed by a lid, mounted adjacent the upright governor shaft 39, Figs. 1 and 3, in which there is a vertically adjustable frame 219. Said frame is supported by an adjusting screw 220 having a swivel connection 221 with the frame and screw threaded in a partition 222 within the casing whereby the rotation of said screw will raise or lower the frame. Said frame is guided in its movements by the guide rods 223 slidably mounted in the partitions 222 and 224 above and below, respectively, any possible adjusted positions of the frame. The frame is provided with a pointer 225 for cooperation with an index 226 representing various speeds in miles whereby the frame and component parts may be set at any preselected location.

In the frame is mounted an electrical switch including a pair of contacts 227 stationary relative to said frame and interposed in the secondary electric circuit to be described below. Coacting with the contacts is a switch blade 228 mounted on the rod 229 having a portion projecting beyond the frame and through a vertical slot 230 in a wall of the casing 218. The rod is normally urged outwardly by a spring 231. On the outer end of said rod 229 is a shoe 232 to be engaged and forced inwardly, along with the rod and switch blade, by a foot 233 mounted on a rod 234 sliding in guide brackets 235 and said foot has a portion mounted between collars 236 on the sleeve 41 so that said collars may revolve relative to the shoe 233 and slide with the sleeve 41 on the governor shaft 39 to move said shoe vertically.

By adjusting the frame 219 through the medium of the screw 220 until the pointer 225 is set on the index 226 at the predetermined maximum speed desired, the shoe 232 will be located in a position relative to the foot 233 which will permit the train or vehicle to attain the shoe. This is accomplished through the medium of the governor 42 and when the speed is exceeded said foot contacts the shoe and forces the latter inward, the switch blade 228 will be disengaged from the contacts 227 and the secondary circuit will be opened to initiate operation of the control mechanism to reduce the speed of the train or vehicle to the desired speed. When the speed of the train or vehicle is reduced the foot will be disengaged from the shoe and the secondary circuit will be again closed to cause normal operation of the mechanism and the train or vehicle can proceed without further interruption and without unduly reducing the speed or stopping the same unless some other dangerous condition exists to open said secondary circuit at another location.

Instead of driving the main control mechanism from the governor shaft 39, the gear 43 may be eliminated and an electric motor 237, Fig. 14, connected directly to the shaft 45 or as a substitute for both the drive from the track, including said governor shaft and the gear 43, and the electric motor, a hydraulic motor 238, Fig. 15, can be utilized. In either of the last mentioned cases, the gear shift 68 may be dispensed with since the drive will always be in only one direction. For purposes of illustration, the hydraulic motor includes a cylinder 239 in which a suitable piston reciprocates. The piston has a piston rod 240 sliding in a guide bracket 241 and the outer end of said piston rod 240 is pivotally connected with a pitman 242 which, in turn, has its outer end pivoted on one face adjacent the perimeter of a gear 243 meshing with the gear 44 on the shaft 45 journalled in the brackets 46.

Figure 16:
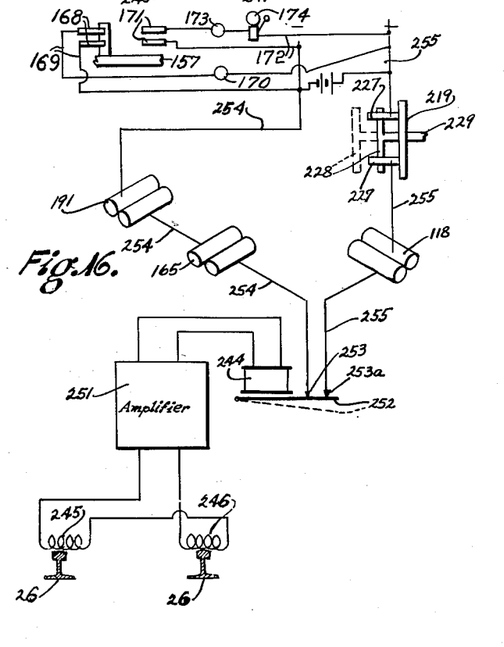
Fig. 16 is a diagrammatic view of the electric circuits of the apparatus and illustrating an induction type of pick-up from the tracks.

The control apparatus of the present invention shown in Fig. 16 is mounted on any single vehicle or the desired one of a train, such as a locomotive, and includes a main relay 244 of the primary circuit which responds to the train governing current in the track rails 26. As illustrated in Fig. 16, the train or vehicle has two windings 245 and 246 in inductive relation to the two track rails and said windings are connected in series in the primary circuit which includes, in addition to the said main relay 244 and the windings 245 and 246, an amplifier 251 of any well known construction, which amplifier continuously supplies energy to the above mentioned main relay 244 while train governing current is being supplied to the track rails.

When current is induced in the coils 245 and 246, the relay 244 is energized through the amplifier 251 to close the contact bar 252 across the terminals 253 and 253a of the lines 254 and 255 which have their other ends connected across a battery or supply source. Electrically interposed in series in the line 254 are separate electromagnets or solenoids 165 and 191, while an additional electro-magnet or solenoid 118, and normally closed switch 227, 228 are electrically interposed in series in the line 255. Hence, in normal operation, the series circuit through the lines 254 and 255 is closed and the solenoids 118, 165 and 191 are energized. The solenoid 118, when energized, serves to return the lever 15 inwards (see Figure 1) after the lever is swung outwards by the arm 114, as described hereinbefore. Energization of solenoid 165, as best seen in Figure 22, serves to draw the pull rod 157 in one direction to engage the switch blade 167 with the contacts 168. Further, normal energization of the solenoid 191 draws the rod 159 and valve plug 193 into a valve closing position.

As the electro-magnet or solenoid 165, under normal operating conditions, maintains the blade 167 in closing engagement with the contacts 168, it is seen in Figure 16 that a closed circuit is defined through the lines 169, contacts 168, blade 167, "safe" signal lamp 170, and supply source. Also, under these conditions, the circuit through the lines 172, signal lamp 173 and audible signal 174 is open.

Upon failure of current in the coils 245 and 246, the relay 244 is de-energized to swing the switch blade 252 out of cantact with the terminals 253 and 253a, and open the series circuit through the lines 254 and 255. The solenoids 118, 165 and 191 are all thereby de-energized, whereupon the lever 115 remains in its position of swinging movement away from the solenoid 118 and effects actuation of the valve 134, and the pull rods 157 and 159 are drawn away from their respective solenoids 165 and 191. Movement of the pull rod 157 away from the solenoid 165 engages the switch blade 167 with the contacts 171 to close a series circuit through the lines 172, signals 173 and 174, and supply source. Further, movement of the pull rod 159 away from its solenoid 191 serves to shift the valve member 193 to its open position.

De-energization of the solenoids 118, 165 and 191 may also be effected by movement of the switch blade 228 from its closed, solid line position in engagement with the contacts 227, to its open, dashed line position away from the contacts (see Figure 16). Opening movement of the switch blade 228 occurs in response to a train speed in excess of a predetermined value, and produces the same, above described results as de-energization of the relay to 244.

The secondary circuit is thus associated with the primary circuit and said secondary circuit includes the relay contact 252, Figs. 1 and 16, together with the companion terminals 253 and 253a which are in comparative relation to said relay contact. The conductors of the secondary circuit are individually connected to said terminals and, for example, the negative conductor 254 is connected to the terminal 253 and, in turn, to the separate solenoids 165 and 191, Figs. 19 and 22, and to one side of a source of electric supply, such as a battery or the power lines within a vehicle or train. In the instance mentioned, the positive conductor 255 is connected to the terminal 253a, the solenoid 118, the pair of the contacts 227, Fig. 3, of the electrical switch of the speed control mechanism within the casing 218 and to the other side of said source of electrical supply. Thus the several devices controlled by the secondary circuit are in series within one another.

The operation of the train control apparatus is as follows:

Assuming that the train or vehicle equipped with the present control apparatus is actually traveling along a track divided into insulated signal blocks and each block is supplied with a suitable electric signal circuit and the shafts 45 and 63 are being properly driven from the vehicle axle, as illustrated in Figs. 1, 10 and 15, respectively, then all of the operating hooks 55, 56 and 57 are continuously reciprocated, either in unison or at varying intervals, through the medium of the crank wheel 48 and component and associated parts. Likewise the cam wheels are being operated in proper time for the purposes required. The operating hooks are normally maintained in elevated positions at the rear ends by the vertically movable oscillators 82—84 and at the forward ends by the supporting cross bar 154.

During normal operation and when the track circuits are energized, as when the track blocks ahead of the one occupied by the train are clear, all cam wheels 75, 76 and 77, or their equivalents, are continuously revolving. When cam 80 or 101 contacts bell crank lever 110, the latter will be actuated to move the upper end of the lever 115 inwardly, as shown in Fig. 1. This will cause the valve 133 to be opened to the intake lines 136 and 141 and the outlet lines or exhaust 143 and 139 causing the supporting bar 154 to descend releasing the forward barb, or hooked ends of the operating hooks. This has occured while the high surfaces of the cam wheels are under the oscillators 82, 83 and 84 thus maintaining the operating hooks in their elevated positions at their rear ends. Before the low surface of cam wheel 75 reaches the oscillator 82 and the electro-magnet means 118 being energized the latter will return the knock-off lever 115 to the position illustrated in Fig. 1 which will retract the vaive plug 132 to the position shown in Fig. 9 and thereby elevate the supporting bar 154 to again support the head or forward ends of the operating hooks.

When the low surface of the cam wheel 75 reaches the oscillator 82 said oscillator is free to descend when a condition arises to force it downwardly to cause the operating hook 55 to descend but as shown in Fig. 1 said operating hook 55 is supported and held in the elevated position at the forward end by the supporting cross bar 154 therefore said operating hook 55 will not engage in the shackle 156 and no operational function occurs.

The same condition applies to the cam wheel 76, its associated oscillator 83 and the operating hook 56 both as to operation and time. As the shaft 70 makes two revolutions to one revolution of shaft 71, for the purpose of timing the cam wheel 77 relative to the other cam wheels 75 and 76, the operations of said cam wheels 75 and 76 will cause two similar operations of their respective functions before the cam wheel 77 effects the operating hook 57.

When the low surface of the cam wheel 77 finally reaches the oscillator 84 the latter will be free to descend to permit the operating hook 57 to do likewise, under certain conditions, the same as previously described in connection with the operating hooks 55 and 56 but again no functional operation effecting the apparatus as a whole occurs.

As above outlined, the apparatus continually operates through repeated cycles of correlated individual movements and the switch including the contact members 168 and the switch blade 167, Figs. 1 and 22, remains closed and the signal 170, Fig. 1, indicates that the secondary signal is intact and therefore the primary or track circuit has not been opened, broken or short circuited.

As previously stated the track represented by the rails 26 is divided into signal blocks and these may or may not be related to the ordinary roadside signals. It is a fact that the track circuits may be arranged to provide for causing an operation of the apparatus when a train is in one, two or other number of blocks behind that block where a dangerous situation exists. Particularly, only for purposes of illustration, the operation of the apparatus will be described in connection with a single element type of electrical track circuit and wherein the functional operations of said apparatus take place within the track signal block directly behind the block in which the dangerous condition exists.

Figure 17:
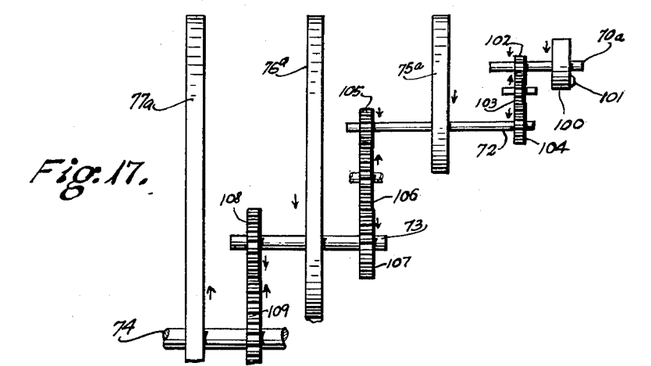
Fig. 17 is a view of a slightly different arrangement of cams for actuating the means to move the inner ends of the operating hooks vertically.

Assuming that a dangerous condition exists in one track block, due to a short circuit, a broken circuit or a train therein, then when a train equipped with the present apparatus enters the track block behind the first mentioned block, the relay contact 252 will be released and the secondary electrical circuit, in which the solenoids 118, 165 and 191 and the switch 228 are interposed, Figs. 16 and 17, will be opened. Then when the cam 80 contacts the bell crank lever 110, the upper end of the lever 115 will be moved inwardly to operate the valve 134 and cause a fluid to enter the upper portion of the cylinder 147 for depressing the piston 148 thereby lowering the bar 154 to release the forward ends of the operating hooks 55, 56 and 57. So long as the solenoid or electromagnet 118 remains deenergized the bar 154 will remain retracted and the upper end of the lever 115 will remain in the inward location.

Then when the low cam surface of the cam wheel 75 reaches the oscillator 82 the latter will descend to said low cam surface and draw the operating hook 55 downwardly and cause its beak 58 to engage the shackle 156 of the rod 157. As the operating hooks are continuously oscillating, the engagement of the operating hook 55 with the aforementioned shackle will pull the rod 157 forwardly and open the circuit to the clear signal 170 and close the circuit to the warning signals 173 and 174 by shifting the blade 167 from the contacts 168 to the contacts 171. This has withdrawn the armature 164 away from the electro-magnet 165, because the latter is also deenergized, and the parts will remain in the projected positions until such time as the electro-magnet is again energized.

As the cam wheels continuously revolve the high surface of the cam wheel 75 will in proper time engage the oscillator 82 and lift the same to again elevate the operating hook 55 but the warning signals continue to function. The cam wheels being properly timed, during the period when the oscillator 82 is raised the low cam surface of the cam wheel 76 will reach the oscillator 83 and the latter will descend onto said low cam surface which will draw the operating hook downwardly until its beak 58 engages the shackle 156 of the rod 158 to intermittently oscillate said rod 158 a few times because each time said rod is pulled forwardly and the tension of the operating hook 56 on said rod 158 is released the spring 175 will retract the rod 158. Thus the valve plug 176 intermittently passes fluid to the whistle 185, to give an additional signal to the operator, and also to the brakes for periodically making a series of brake applications which will gradually slow down the train in a manner similar to the manual operation of a train brake system. When the high cam surface of said cam wheel 76 returns to the oscillator 83 the latter will be lifted and the operating hook 56 elevated to disengage its beak from the shackle of the rod 158 so the latter will be or will remain retracted thus shutting off the supply of fluid to the whistle and brake so that no further brake application is made at this point and the train may proceed.

Because of the timing of the cam wheels the operating hook 55 will again be lowered as the operating hook 56 is elevated but nothing further is accomplished and before the low cam surface of the cam wheel 77 reaches its associated oscillator 84, the cam wheel 76 will make at least two revolutions so that a second intermittent application of the brake will be made and other warning signals sounded on the whistle 185 and the high cam surface of the cam wheel 76 will have elevated the operating hook 56. When the low cam surface of the cam wheel 77 finally reaches its companion oscillator 84 the latter will descend to said low cam surface and draw the operating hook 57 downwardly to cause its beak to engage the shackle of the rod 159. Due to the plurality of passageways 194, 195 in the valve plug 193 one or more initial brake applications are accomplished prior to the final application when the passageway 194 through the valve plug 193 reaches the full open position, where it will remain until, as hereinafter explained, to bring the train to a complete stop.

When the apparatus is actuated from a vehicle wheel, Fig. 1, said apparatus will cease functioning when the train stops but if actuated by an electric motor, Fig. 14, or a fluid motor, Fig. 15, the apparatus will continue to partially function at least as far as and including the longitudinal reciprocation and intermittent raising and lowering of the rear ends of the operating hooks but no functional operation takes place to change the cab warning signals or brake applications or the elevating of the bar 154.

When the track circuit is restored, the primary circuit, including the relay 244, is reenergized to move the relay contact 252 to its closed position thus closing the secondary circuit and reenergizing the electro-magnets 118, 165 and 191 and restoring current to the switch of speed controller, which switch includes the contacts 227 and blade 228. The reenergizing of said secondary circuit causes the electro-magnet 118 to attract the lower end of the lever 115, Fig. 1, and move the upper end thereof outward to reverse the flow of fluid and lift the piston 148, Fig. 9, to elevate the bar 154 which will lift the forward ends of the operating hooks 55, 56 and 57 even though one oscillator 82, 83 or 84 might be on the low surface of its coacting cam wheel.

Attention is called to the fact that for a short period of time prior to the cam 80 engaging the bell crank lever 110 and until shortly thereafter the high cam surfaces of all cam wheels are in engagement with their respective oscillators 82, 83 and 84. Thereafter, as the low cam surface of the cam wheel 75 passes beneath its oscillator 82 the high cam surfaces of the cam wheels 76 and 77 remain in engagement with their respective oscillators and by the time the low cam surface of the cam wheel 76 reaches its oscillator 83 the high cam surface of the cam wheel 75 will have again reached its oscillator 82 but the high cam surface of the cam wheel 77 is still in engagement with its oscillator 84. These operations of the cam wheels 75 and 76 will be repeated and their high surfaces on the second revolution will be in engagement with their respective oscillators just prior to the low cam surface of the cam wheel 77 engaging its oscillator 84. Thus, at all times, the high surfaces of two cam wheels are under their respective oscillators when the low cam surface of the remaining cam wheel is under its oscillator. This complete cycle of operations is repeated continuously and each cycle is accomplished according to a predetermined time or distance of travel of a train along the track.

Simultaneously with the reenergizing of the electromagnet 118, the electro-magnets 165 and 191 are reenergized which will return the rods 157 and 159 to their normal retracted positions, as shown in Figs. 18, 19 and 22, thereby restoring the circuit of the cab clear signal, represented by the signal means 170, and restoring the brake system to normal operational condition, by closing the valve in the casing 196, as well as opening the circuit of the cab preliminary warning signal, represented by the visible and audible signal means 173 and 174, respectively. With the restoration of the elements to their normal operational condition, the train is ready to be again manually controlled by the operator in the usual manner if he has at any time failed to retain complete control upon receiving the various warning signals but should he heed said warning signals he can retain his control of the operation of the train.

Should the secondary circuit be restored after the descent of the supporting bar 154 and the depression of either or both of the operating hooks 55 and 56, the parts will be immediately returned to their normal positions and the operator may proceed without delay.

The cam wheels illustrated in Fig. 17 are depicted for the purpose of disclosing a different method of timing although the operation is similar to that previously described. By so timing the cam wheels, the period of complete operation of the apparatus is extended. For example, the cam 101 actuates the bell crank lever 110 and causes the supporting bar 154 to descend if the secondary circuit is not energized then said supporting bar 154 remains elevated. After this operation of the cam 101 takes place twice, the low cam surface of the cam wheel 75a will reach the oscillator 82 and allow it to descend under conditions previously described. Upon completion of two revolutions of the cam wheel 75a the low cam surface of the cam wheel 76a will reach its oscillator 83 and place it in condition for descent. Likewise upon completion of two revolutions of said cam wheel 76a the low cam surface of the cam wheel 77a will reach its oscillator 84 and also place it in condition for descent.

The reason for lengthening the time of operation of the several operating hooks subsequent to the operations of the kick-off lever 115 is to allow sufficient time for any of the elements to return to their normal positions and conditions should any of the circuits be momentarily disarranged due to shocks, undesired oscillations of the vehicle or temporary shorting of the track circuit by flash inundations and the like.

It will be apparent that the speed control mechanism disclosed particularly in Fig. 3 must be actuated by some means operated in unison with the travel of the vehicle or train, such as that represented by the reference numerals 25 to 39, inclusive, even when the balance of the train control apparatus is operated by independent means such as represented by the motors in Figs. 14 and 15.

Of course I do not wish to be limited to the exact details of construction herein shown and described as these may be varied within the scope of the appended claims without departing from the spirit of my invention.

Having described my invention what I claim as new and useful is:

1. In a train control apparatus, the combination with a vehicle having a brake system provided with the usual manually operated control mechanism, of an electric circuit including a visible clear signal, a second electric circuit including visible and audible preliminary warning signals, means to close either of said circuits and simultaneously open the other of said circuits, electro-magnetic means for operating the circuit closing means to normally maintain the clear signal circuit closed and the preliminary warning signal circuit open, a valve for initially causing a limited application of the brake system independently of the manually operated mechanism, a secondary audible warning signal connected with and actuated by the operation of said valve, means to normally urge said valve towards the inoperative position, a second valve for gradually completely operating said brake system also independently of the manually operated mechanism, electro magnetic means normally maintaining said second valve in the inoperative position, separate operating hooks for respectively engaging each of the valve operating means and the signal circuit closing means independently of one another, a supporting bar disposed beneath the forward ends of all of said operating hooks, means to raise and lower said supporting bar, said means including a fluid tight cylinder with a piston slidably mounted therein and provided with a shank connected to said supporting bar, a fluid inlet and outlet for the cylinder both above and below the piston, a fluid control valve connected with said inlets and outlets to simultaneously open one inlet and one outlet on one side of the piston and close one inlet and one outlet on the other side of said piston, mechanism to intermittently operate said fluid control valve to lower the supporting bar, electro-magnetic means to operate the fluid control valve to elevate the supporting bar, means to reciprocate the operating hooks longitudinally, means to oscillate the rear ends of operating hooks perpendicularly, a secondary electric circuit including the several electro-magnet means in series and a relay contact, and a primary electric circuit connected with track circuits and including a relay to control the relay contact.

2. The train control apparatus according to claim 1 in combination with means to regulate the timings of the longitudinal reciprocation of the operating hooks.

3. The train control apparatus according to claim 1 in combination with means to regulate the longitudinal reciprocation of the several operating hooks relative to each other.

4. In a train control apparatus mounted on a vehicle, separate individual means for alternately producing clear and warning cab signals, for producing a secondary warning cab signal and initial intermittent brake applications for gradually reducing a vehicle speed, and also for producing a final brake application without interfering with a manual brake application, operating hooks to actuate said separate individual means when said hooks are placed in cooperative relation with said separate individual means, means for continuously reciprocating said operating hooks longitudinally at least during the time the vehicle is moving, a supporting cross bar disposed beneath the forward ends of all of said operating hooks, a fluid tight cylinder below said cross bar, a piston slidably mounted in said cylinder, a rod connected to said piston and cross bar to elevate and depress said cross bar as the piston slides up and down, an inlet line leading from a source of fluid supply to the cylinder above and below the piston, an outlet line leading from said cylinder both above and below said piston, a valve in said lines including a valve plug to simultaneously open a certain inlet and a certain outlet and close the others, a perpendicular lever pivoted intermediate its ends and having its upper end connected to the valve plug, means to draw the lower end of said lever inward, means to periodically force the upper end of said lever inward, and means to temporarily hold said lever in the position where the upper end thereof is inwardly unless the means to draw the lower end inward is effective and to hold said lever in either position against accidental shifting thereof.

5. The train control apparatus according to claim 4 wherein the means to draw the lower end of the perpendicular lever inward consists of an electro-magnetic means.

6. The train control apparatus according to claim 4, in combination with vertically movable oscillators loosely coupled to the rear ends of the operating hooks, and a set of cams timed to intermittently and alternately raise and lower the said oscillators for imparting similar movements to the rear ends of the operating hooks so that one is depressed while two remain elevated.

7. The structure of claim 6 wherein each oscillator comprises a body having a bifurcated lower end and a through recess from front to back in the upper portion, a follower wheel journalled in the bifurcated end, a roller journalled in the body within the lower portion of the recess and on which an operating hook is adapted to rest, a forked rod within the upper portion of said recess and slidable longitudinally, a second roller within said recess journalled on an axle carried by the fork end of said forked rod, the ends of said axle extending into longitudinal slots in the side walls of the oscillator body in the region of the recess, and a spring to urge the forked rod inwardly whereby said second roller will be yieldingly held against an operating hook resting on the first mentioned roller.

8. A train control apparatus comprising, in combination with a vehicle having a fluid operated brake system provided with the usual manually operated control mechanism, of a plurality of operating hooks of appreciable length, mechanism to which the rear ends of said operating hooks are connected for imparting a longitudinal reciprocating motion thereto, oscillators actuated by cams for alternately lowering and raising the rear ends of the operating hooks in a predetermined order, supporting means disposed beneath the forward portions of said operating hooks to normally maintain the forward ends thereof in elevated positions, said supporting means being withdrawable whereby said forward ends of the operating hooks may descend, fluid operated means to actuate said supporting means and having inlets and outlets controlled by a valve including a slidable valve plug, an upright lever pivoted intermediate its ends and having its upper end connected to the valve plug, electro-magnetic means for drawing the lower end of the upright lever inwardly to set the fluid controlling valve for raising and normally maintaining the supporting means in an elevated position, a bell crank lever for imparting an inward movement to the upright lever for operating the valve plug of the fluid controlling valve for reversing the movements of the supporting means, a kick-off cam actuated by the mechanism which reciprocates the hooks and intermittently engaging the end of the bell crank lever opposite the upright lever to actuate said bell crank lever at regular intervals, a rod to be moved longitudinally in one direction by one operating hook for opening a clear signal electrical circuit and closing a preliminary warning signal circuit when the supporting means and a certain oscillator are both in lowered positions, an electro-magnetic means for moving said rod in a reverse direction upon elevation of the oscillator controlling the hook associated with the rod regulating the clear and warning signals, a second fluid controlling valve for controlling an initial flow of fluid through the brake system to produce a slight brake application for reducing the vehicle speed when a second operating rod actuates said second valve in one direction to open the same when the supporting means and a certain other oscillator are both in lowered positions, a spring to actuate said second valve in the opposite direction for closing the latter, the alternate opening and closing of said second valve at frequent intervals producing the effect of intermittent manual operation of the brake system for gradual reduction of speed, a warning signal connected with said second valve, a third fluid controlling valve for controlling several passages of fluid through the brake system to further reduce the speed of and finally stop the vehicle when a third operating rod actuates said third valve in one direction to gradually open said third valve to the fullest extent when the supporting means and a third oscillator are both in lowered positions, an electro-magnetic means to actuate said third valve in the opposite direction for closing the same upon elevation of the oscillator controlling the hook associated with said third operating hook, a primary circuit controlled by track signal circuits, and a secondary circuit controlled by said primary circuit and connected with all of the electro-magnetic means, said primary and secondary circuits, when closed, maintaining all of the operating hooks in inoperative positions but when both the primary and secondary circuits are open or the primary circuit is shortened the operating hooks are lowered successively whereby said hooks are temporarily attached to their respective rods until the primary and secondary circuits are again restored.

9. In a train control apparatus, the combination with a vehicle having a fluid operated brake system provided with the usual manually operated control system, of two fluid controlling valves each having a shackle at the outer end of a rod to be engaged by an operating member, one of said valves being normally urged towards the closed position by a spring and the intermittent operation of said spring actuated valve causing a gradual application of the brakes to reduce the speed of the vehicle and the other valve adapted to cause a further gradual reduction of speed and finally producing a complete application of the brake system for stopping the vehicle, electro-magnetic means to return the second valve to the closed position, clear and warning cab signal means each in a separate circuit, a reciprocal rod having means to alternately open and close said cab signal circuits and also provide with a shackle to be engaged by an operating member, an electro-magnetic means to normally maintain said reciprocal rod in a retracted position, a set of longitudinally reciprocal operating hooks located to individually engage the several shackles, one after another, to move them and their component parts forwardly against the action of their retracting means, a vertically movable supporting bar at the forward ends of said operating hooks to normally support said forward ends in elevated positions, mechanism to raise and lower said supporting bar and including electro-magnetic means to maintain the last mentioned mechanism in condition to hold the supporting bar elevated, oscillators to positively raise and lower the rear ends of the operating hooks, a set of cams for continuously operating the oscillators and the supporting bar controlling mechanism in one direction at predetermined time periods, mechanism for continuously longitudinally reciprocating said operating hooks at predetermined intervals and including a primary shaft with a gear on one end thereof, a secondary shaft for transmitting motion to the cams and including a gear meshing with the first mentioned gear, means to revolve said primary shaft, a primary electrical circuit controlled by track signal circuits, and a secondary electric circuit responsive to said primary circuit and connected with all of the electro-magnetic means, said primary and secondary electrical circuits, when opened, shorted or temporarily damaged, deenergizing the said electro-magnetic means and thereby starting the functional operations of the operating hooks.

10. The structure according to claim 9 in combination with a reversing mechanism connected with the secondary shaft for reversing the movements of the cams when the direction of travel of the vehicle is reversed.

11. The structure according to claim 9, wherein the means for revolving the primary shaft includes an upright shaft having a gear thereon meshing with the gear on said primary shaft, and means for transmitting motion from a vehicle wheel to said upright shaft.

12. The structure of claim 11, in combination with a governor connected to the upright shaft, a foot slidably mounted adjacent the governor and attached to the latter for movement therewith parallel to the upright shaft, a switch supporting frame movably mounted within a substantially closed casing, an electric switch including a movable blade, said switch being in the secondary electrical circuit in series with the several electro-magnet means and mounted in said frame for movement therewith, a spring actuated shoe connected with the switch blade and normally maintaining the switch closed, said shoe projecting outside of the casing and in the path of travel of the foot whereby when the foot contacts said shoe the switch will be opened to also initiate the functional operations of the operating hooks, means to adjust the frame for positioning the shoe relative to the foot in accordance with the distance of travel of said foot relative to mileage speed of travel of the vehicle, and an index with which a pointer on the frame cooperates to indicate the adjustment of the frame relative to speed miles per hour.

References Cited in the file of this patent

UNITED STATES PATENTS

| | | |
|---|---|---|
| 993,428 | Williams | May 30, 1911 |
| 1,122,643 | Rice | Dec. 29, 1914 |
| 1,552,390 | Campbell | Sept. 1, 1925 |
| 1,789,274 | Howe | Jan. 13, 1931 |
| 1,835,716 | Miller et al. | Dec. 8, 1931 |
| 1,895,067 | Bone | Jan. 24, 1933 |
| 2,130,444 | Allen et al. | Sept. 20, 1938 |
| 2,559,397 | Bushnell | July 3, 1951 |